United States Patent [19]

Aoyama

[11] Patent Number: 5,136,399
[45] Date of Patent: Aug. 4, 1992

[54] IMAGE RECORDING APPARATUS HAVING EDITING FUNCTIONS AND AN EDIT TABLE WITH BANK ORDERS

[75] Inventor: Teruyuki Aoyama, Kanagawa, Japan

[73] Assignee: Fuji Xerox Co., Ltd., Tokyo, Japan

[21] Appl. No.: 698,111

[22] Filed: May 10, 1991

[30] Foreign Application Priority Data

May 15, 1990 [JP] Japan .................. 2-126106

[51] Int. Cl.$^5$ ................. H04N 1/21; G09G 1/28
[52] U.S. Cl. ................. 358/296; 358/452; 358/453; 340/701; 340/703
[58] Field of Search ......... 358/296, 452, 453; 340/701, 703; 364/518

[56] References Cited

U.S. PATENT DOCUMENTS

| | | | |
|---|---|---|---|
| 4,538,183 | 8/1985 | Kanno et al. | 358/452 |
| 4,550,315 | 10/1985 | Bass et al. | 340/703 |
| 4,760,608 | 7/1988 | Suzuki | 358/452 X |
| 4,847,604 | 7/1989 | Doyle | 340/703 X |
| 4,866,539 | 9/1989 | Marazzi et al. | 358/296 X |
| 4,958,147 | 9/1990 | Kanema et al. | 340/703 X |
| 4,958,301 | 9/1990 | Kobayashi | 340/703 X |

FOREIGN PATENT DOCUMENTS 0252613  1/1988  European Pat. Off. .

*Primary Examiner*—Benjamin R. Fuller
*Assistant Examiner*—Eric Frahm
*Attorney, Agent, or Firm*—Finnegan, Henderson, Farabow, Garrett and Dunner

[57] ABSTRACT

Edit tables each listing a plurality of edit processes and associated ranks of order are stored in a control means. Instructions designating edit areas in a displayed document image with respective ranks of order and one of the edit tables are input through a touch panel or digitizer. The edit processes in the designated edit table are applied to the respective designated edit areas having the same rank of order to produce edited image data. A hard copy is produced based on the edited image data.

5 Claims, 11 Drawing Sheets

| COLORING TABLE | |
|---|---|
| FIRST RANK | C1 |
| SECOND RANK | C2 |
| THIRD RANK | C3 |
| ⋮ | ⋮ |
| NTH RANK | CN |

| 100 EDIT PROCESS TABLE | |
|---|---|
| FIRST RANK | E1 |
| SECOND RANK | E2 |
| THIRD RANK | E3 |
| ⋮ | ⋮ |
| NTH RANK | EN |

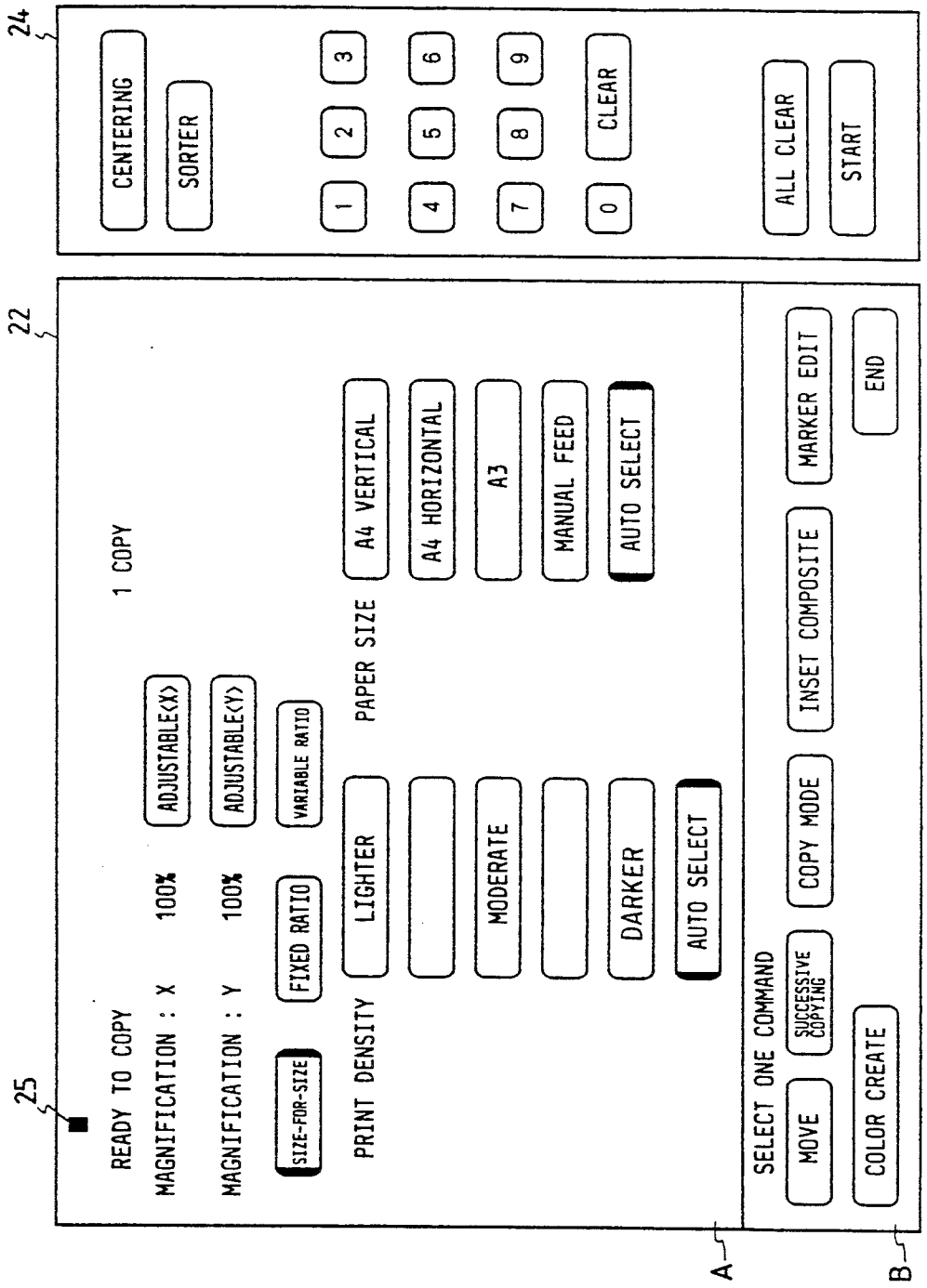

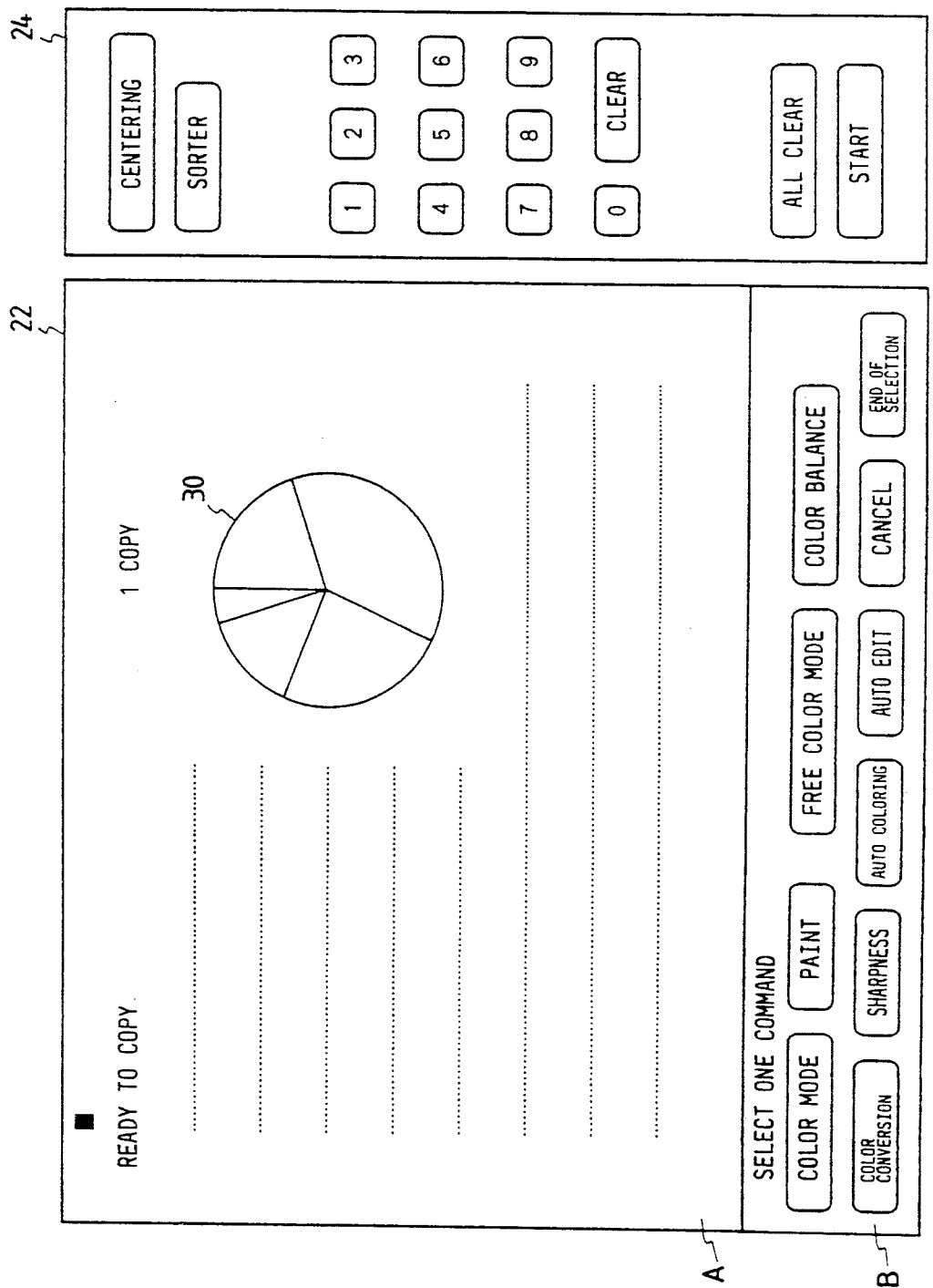

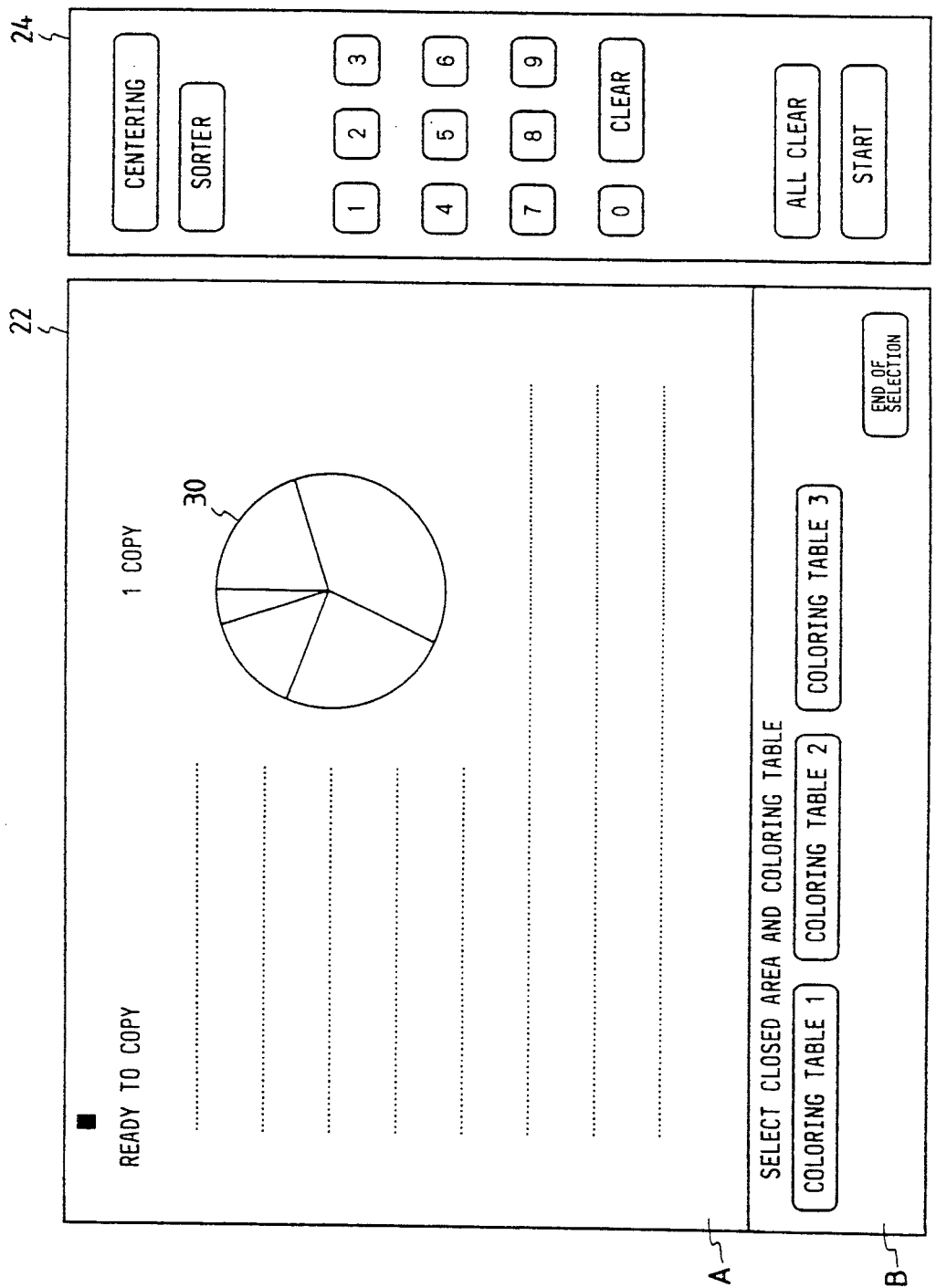

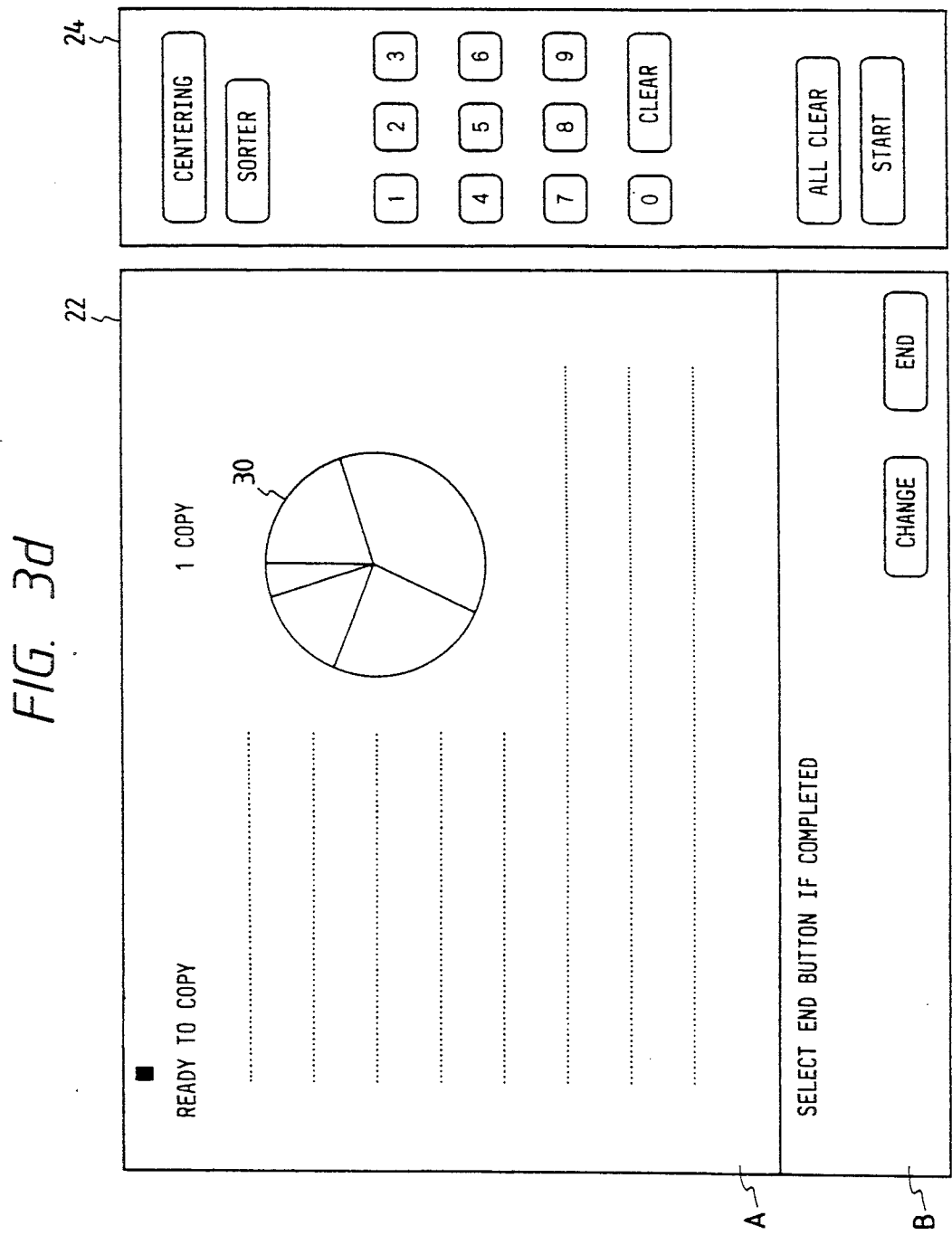

IMAGE RECORDING APPARATUS HAVING EDITING FUNCTIONS AND AN EDIT TABLE WITH BANK ORDERS

BACKGROUND OF THE INVENTION

The present invention relates to an image recording apparatus such as a copier and, more particularly, relates to an image recording apparatus in which edit operations can be performed easily. Recent models of image recording apparatus, such as a copier, are equipped with a microcomputer to exploit enhanced control technologies and image data processing technologies. With such technologies, various editing functions including "coloring" and "color conversion" can be realized. During "coloring", a means capable of setting positions, such as a digitizer, is used to designate a closed area depicted in a document or to set a rectangular area in a document image while, at the same time, a color is designated for filling the closed area of interest with the designated color. During "color conversion", a digitizer or some other suitable means is used to set a rectangular area on a document and, at the same time, a color is designated, whereby the color of characters in the rectangular area of interest is changed from black to the designated color.

One of the problems with conventional image recording apparatus having editing functions is its difficulty of operation. For example, in the "coloring" process as an an operator must designate both an area and a color. This problem is particularly significant when filling several associated closed areas with different colors as in the case of dividing a circle graph into several areas which are to be filled with different colors, e.g., five to seven colors. When color such a circle graph, it is not enough simply to arrange several colors. It is also desirable to arrange colors that are most effective, for example, colors that are easily distinguished or perceived. However, determining such color combination can be cumbersome for ordinary users. A further problem is that if there are many colors to be arranged, a user has to remember the colors he has already designated. If he forgets the colors he has already designated he will eventually use the same color again, so that it is no longer possible to distinguish those areas which he intended to be clearly differentiated from one another.

The following problems also occur in conventional image recording apparatus having editing functions. It is common to underline a portion of a document to which one wishes to draw attention. However, since conventional apparatus have color conversion capability, the title or subtitle of a document or its important portion can also be converted from black characters to red ones. Specifically, titles, for example, characters can be rendered conspicuous by displaying them against a red background. By making use of these various editing means, an image recording apparatus having editing functions is capable of emphasizing those portions which are to be emphasized. However, it should be considered that in some cases the degree of emphasis varies from one portion to another. For example, a text may include three kinds of portions to be emphasized at different levels of emphasis. In such a case, it is extremely difficult for ordinary users to make a decision as to which edit process is desirable as a first level (i.e., strongest) emphasis and which edit processes are desirable for second and third level emphasis. Furthermore, if a document to be copied contains many pages, the edit processes to be applied for attaining the respective levels of emphasis have to be consistent for the whole document and, to this end, a user must remember, by taking notes or by some other method, which edit process was applied to the portion that requires the first level emphasis and which edit processes were applied to the portions that require the second and third level emphasis. This can be a cumbersome task.

SUMMARY OF THE INVENTION

The present invention solves the problems of conventional apparatus discussed above and has an object of providing an image recording apparatus with which mutually associated edit processes, such as the arrangement of a plurality of colors and the editing adapted for providing desired levels of emphasis, can easily be performed.

If a selection has been made from a certain edit menu with an inputting unit while closed areas have been designated by means of a coordinates inputting unit, a control unit, by making reference to a coloring table, assigns colors $C_1, C_2, \ldots$ to the respective closed areas in accordance with the designated order. As a result, the respective closed areas are filled with the desired colors automatically in accordance with the designated order. Not only does this improve the ease of operation, but it also relieves a user of the need to determine a best color arrangement.

BRIEF DESCRIPTION OF THE DRAWINGS

FIGS. 3a-3d are charts showing examples of various displays on a screen of a display unit when a circle graph is colored;

FIG. 4 is a chart showing an example of an edit process table;

DESCRIPTION OF THE PREFERRED EMBODIMENTS

An embodiment of the present invention will be described below. The following description concerns a color copier as an example of the image recording apparatus, but it should be noted that the present invention is by no means limited to color copier and that the present invention can be applied to other image recording apparatus including printers, facsimile machines and image filing apparatus.

Figure 1:
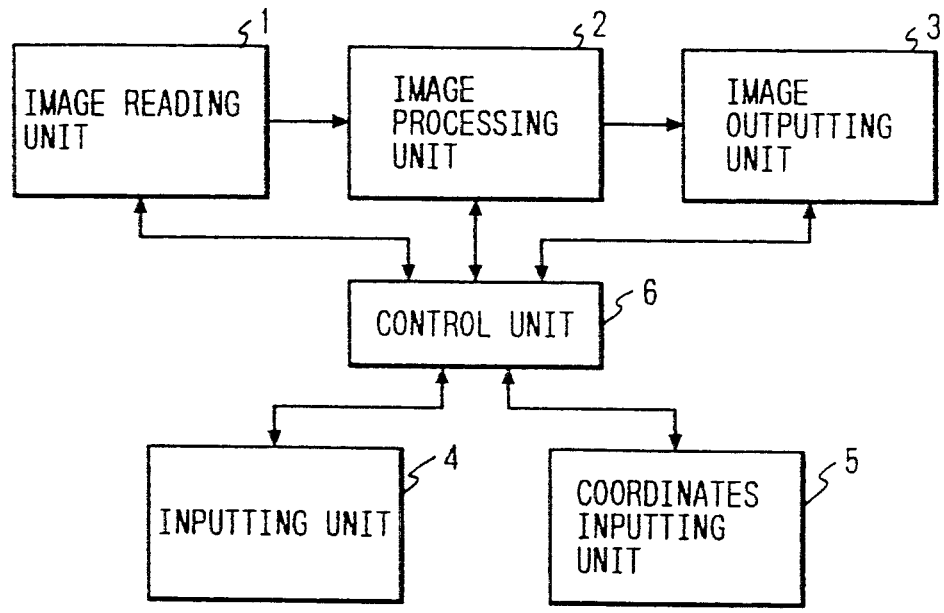
FIG. 1a is a block diagram showing a general composition of an image recording apparatus of the present invention.
FIG. 1b is a chart showing an example of a coloring table.

The present invention which, as shown in FIG. 1a, comprises: an image reading unit 1 equipped with a line sensor, for reading a document image while separating colors; an image processing unit 2 for performing predetermined image processing on color image data obtained by said image reading unit 1; an image outputting unit 3 for performing exposure and development based on an output from said image processing unit 2, thereby producing a hard copy; an inputting unit 4 for designating a copy job including the number of copies and selection of a particular edit process; a coordinates inputting unit 5 comprising a digitizer, etc.; and a control unit 6 for coordinating operations of these units, said control unit 6 being equipped with an edit table into which the contents of a plurality of edit processes are written together with preset ranks of order. A coloring table shown in FIG. 1b is an example of the edit table 6, and N colors $C_1, C_2, \ldots, C_N$ are written into that table together with their ranks of order.

Figure 2:
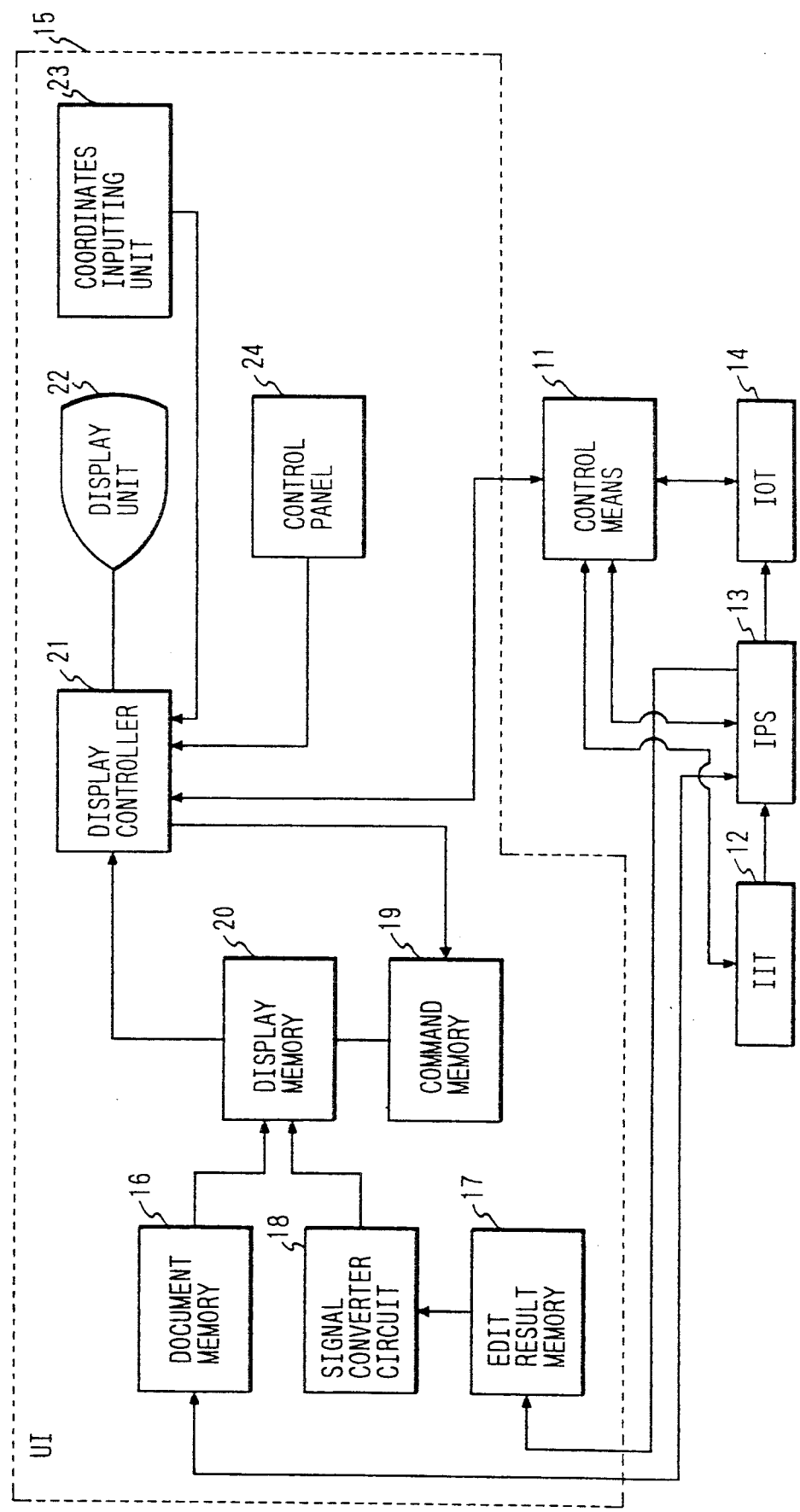
FIG. 2 is a block diagram showing a composition of an image recording apparatus, i.e., a color copier, according to an embodiment of the present invention.

FIG. 2 shows a composition of an embodiment of the image recording apparatus of the present invention which is depicted in FIG. 1a. As shown, the apparatus comprises a control means 11, an image reading unit (or image input terminal, IIT) 12, an image processing unit (or image processing system, IPS) 13, an image outputting unit (or image output terminal, IOT) 14, an inputting unit (or user interface, UI) 15, a document memory 16, an edit result memory 17, a signal converter circuit 18, a command memory 19, a display memory 20, a display controller 21, a display unit 22, a coordinates inputting unit 23, and a control panel 24.

Figure 6:
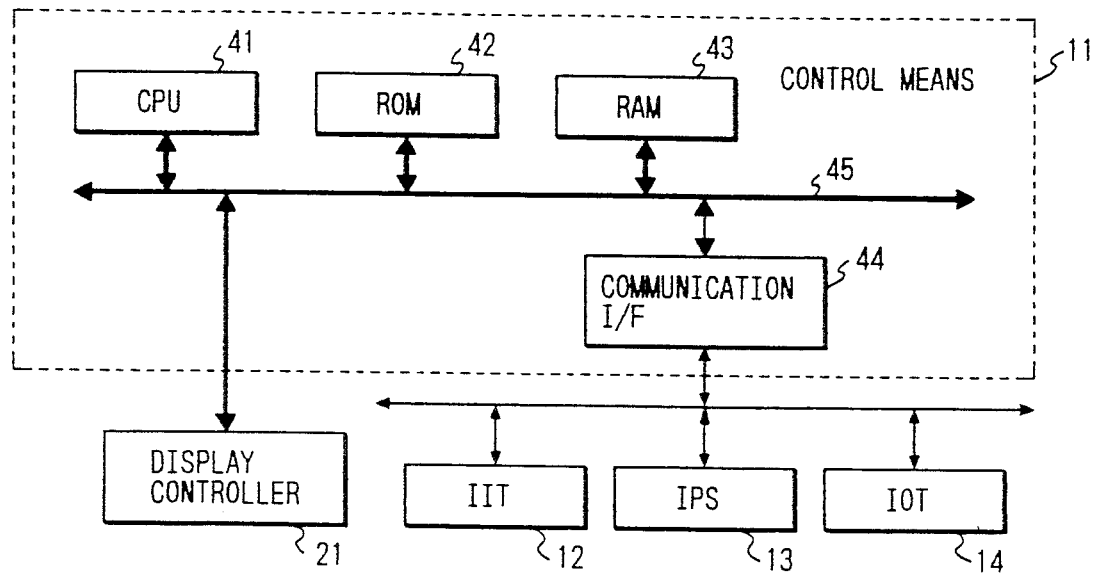
FIG. 6 is a block diagram showing the composition of a control means of the image recording apparatus according to a prepared embodiment of the present invention.

Control means 11 coordinates the operations of IIT 12, IPS 13, IOT 14 and UI 15, and all of the operations described below are controlled by control means 11. As shown in FIG. 6, control means 11 has a CPU 41, a ROM 42. A RAM 43 and a communication interface 44 are connected to CPU 41 through a CPU bus 45. CPU 41 communicates with each of IIT 12, IPS 13 and IOT 14 through communication interface 44.

IIT 12 detects an image of a document to produce separate electric signals of three primary colors, red (R), green (G) and blue (B), and is typically composed of a CCD line sensor assembly equipped with color filters hereinafter referred to as a "line sensor"). The outputs of the line sensor are processed, as required, by various steps including gain adjustment, offset adjustment and shading correction, and is digitized in a certain number of bits, say, 8 bits, to produce B, G and R digital density data, which are then supplied to IPS 13. For practical applications, it is satisfactory for the line sensor to have a resolution of about 16 dots/mm.

IPS 13 receives the B, G and R color density data from IIT 12, converts said data to toner signals of yellow (Y), magenta (M), cyan (C) and black (K), selects a toner signal X of a specified process color, performs binary conversion to create on/off data of the process color toner signal, and outputs said data to IOT 14. In the meantime, various kinds of data processing including density adjustment, contrast adjustment and color balance adjustment are performed to enhance the reproduction performance in such aspects as color, gradation and resolution. In addition, various edit processes including coloring and color conversion are performed. The specific methods of performing various adjustments including density, contrast and color balance adjustments, as well as various edit processes including coloring and color conversion, are well known and need not be described here in detail.

IOT 14 performs exposure, development and fusing for each of the Y, M, C and K color processes, and is equipped with a photoreceptor, an exposure unit using a light source such as a laser for writing into the photoreceptor the on/off data produced in IPS 13, developers for Y, M, C and K, a fuser, etc.

As shown in FIG. 2, the following components: a document memory 16 for storing a document image that is read by IIT 12; an edit result memory 17 for storing an image obtained as a result of performing desired edit processes; a signal converter circuit 18 for converting the toner color data of Y, M and C stored in the edit result memory M to R, G and B data; a command memory 19 for storing various menu pictures; a display memory 20 in which image data output from document memory 16 or signal converter circuit 18 is synthesized with the menu screen from command memory 19; a display controller 21 for providing control means 11 with button information sent from, coordinates inputting unit 23 or control panel 24, and for constructing a display picture based on instructions from control means 11; display unit 22, which is typically composed of a color CRT or a color liquid crystal display; coordinates inputting unit 23, which is typically composed of an optical or pressure-sensitive touch panel or a digitizer having a transparent member and positioned on the front face of display unit 22, which is for providing soft buttons in combination with the displayed picture, and control panel 24 having a ten-key pad, a START key, etc. that always are in a selectable state. The buttons provided on control panel 24 may be either hard or soft buttons.

As will be described later, since the color copier under consideration displays the document image that is read by IIT 12, the display on the display unit 22 is performed on a bit map basis, at least for the area where the read document image is to be displayed. Details of the individual components of UI 15 will be described later.

The color copier having the construction described above is further characterized in that the control means 11 is equipped with an edit table into which the contents of several edit processes are written together with preset ranks of order. While various types of edit tables are considered, one example is shown in FIG. 1b.

The table shown in FIG. 1b specifies the order of colors with which designated closed areas are to be filled for coloring. Color $C_1$ is assigned to the first designated closed area; color $C_2$ to the second designated closed area; and color $C_N$ to the Nth designated closed area. This assignment permits easy coloring of a plurality of closed areas. More than one coloring table may be provided. For example, a table for coloring a circle graph, a table to be used for creating colors that give an impression of warmth, a table to be used for creating colors that give an impression of coolness, or any other tables may be selected depending on particular use. The value of N which denotes the number of colors to be assigned is variable, but 5-7 colors will usually suffice.

The operation of coloring a circle graph using the table shown in FIG. 1b will be described below.

When power is supplied to the copier main body, control means 11 performs a start-up process. Upon completion of the start-up, the control means 11 operates to display an initial picture on display unit 22 by the following procedure. First, control means 11 instructs display controller 21 to display an initial picture. In response to this instruction, display controller 21 reads the pattern of the initial picture out of command memory 19. The read-out pattern of the initial picture is stored in display memory 20, and then read out by display controller 21 in synchronism with the scanning of display unit 22, to be displayed on display unit 22. The initial picture may appear as shown in FIG. 3a.

In the case of FIG. 3a, display unit 22 is shown to be closely adjacent to control panel 24, but their relative positions are determined by the composition of control panel 24. If soft buttons are to be provided on control panel 24, it can be positioned in juxtaposition with display unit 22. If, on the other hand, hard buttons are to be provided, thereon, control panel 24 is positioned a certain distance away from display unit 22. The former layout is adopted in FIGS. 3a-3d.

The picture displayed on display unit 22 is divided into the two areas A and B. Area A is used to display a menu of the conditions that are indispensable for performing copying, namely, the setting of the number of copies, magnification, copy density and paper size. Area B is used to display other means such as editing processes. In the case shown in FIG. 3a, area B is provided with soft buttons to be pressed for executing the following processes: MOVE, which moves a desired image area to a desired position; SUCCESSIVE COPY, which copies an enlarged image of a portion of a document onto several consecutive copy sheets which copies a portion of a document in, either as it is or after reduction in size, several areas of a single copy sheet; INSERT COMPOSITE, which makes a composite copy by inserting a desired image area of a certain document into a desired, position of another document; MARKER EDIT, which performs trimming (extraction), masking (deletion) and other edit processes on a desired document area that is designated with a marker pen of a predetermined color; and COLOR CREATE, which performs various color-associated edit processes including color conversion, color painting, automatic coloring and automatic editing, the latter two processes being in accordance with the present invention. As will be described later, since area A is used to display the document image as read by IIT 12 or the edited image, at least this area A is required to perform display on a bit map basis. Display in area B may be performed either on a bit map basis or on a tile basis. The areas shown in FIG. 3a that have "SIZE-FOR-SIZE", "FIXED RATIO", "VARIABLE RATIO" and other titles enclosed with rectangular soft buttons, and menu selection is performed by touching one of these rectangular areas.

According to the initial picture of FIG. 3a, one copy is to be made. With regard to copy magnification, SIZE-FOR-SIZE (i..e, 100%) soft button is reverse-displayed. With regard to print density and paper size, AUTO SELECT soft buttons are also reverse-displayed to indicate that they are selected. The color mode is the four full color mode as indicated by predetermined color patch 26 at a predetermined position in the upper left corner of FIG. 3a. Accordingly, the displayed picture is in a default (i.e., initially set) state. Color mode selection can be effected by touching the COPY MODE button in area B. When this button is touched, a pop-up menu is opened in area B to display soft buttons for four full color mode, three full color mode, a monochrome mode, a black-and-white mode, etc. A desired color mode can be selected by depressing the associated soft button. The same is true with other soft buttons.

Control panel 24 has the following buttons. A CENTERING button insures that a document is copied with its center aligned with the center of copy paper. In other words, this button insures correct copying on the paper irrespective of the position on a platen in which the document is placed. IPS 13 operates to detect the size and center of the document and to bring the center of the document into registry with the center of the paper. A SORTER button, is pressed when a sorter is to be used. Preferably, either a stacking mode a sorting mode may be selected. Buttons 0-9 constitute a ten-key pad, and are used to enter inputs such as the number of copies and the desired magnification. (for a variable ratio job). A CLEAR button is used to reset the number of copies and other inputs entered with the ten-key pad. The ALL CLEAR button is used to clear all of the functions that are set currently, thereby returning the setting to a default state. A START button is used to execute copying. Although not shown in the figure, other buttons such as an interrupt button and an information button may also be provided as will be apparent to one of ordinary skill in the art.

Suppose that a document is placed on the platen with the initial picture being displayed on display unit 22. When the COLOR CREATE button is touched, control means 11 detects that event and instructs IIT 12 to read the document. At the same time, control means 11 instructs IPS 13 to send the output image data from IIT 12 into document memory 16 without performing any data processing. As a result, the image data of the document as read by IIT 12 is stored in document memory 16.

The memory capacity of document memory 16 will be described below. It is assumed in the following discussion that display unit 22 is of a 14-inch size, having approximately $640 \times 480$ pixels. Further, since the picture displayed on display unit 22 is divided into areas A and B, the number of pixels in area A where the document image is to be displayed is less than $640 \times 480$. On the other hand, when a document of A3 size is read by IIT 12, the number of pixels involved is about $5,000 \times 7,000$. Therefore, if a document of A3 size is read normally and if its whole image is to be displayed in area A, the image data has to be reduced to less than a hundredth of the original data. This can be achieved by any one of the following three methods. In the first method, document memory 16 is designed so as to have a sufficient capacity to store all the pixels that are obtained when a document of A3 size, which is the largest,size that can be read by the copier under consideration, is read and the pixels are thinned when the image data is written into display memory 20. In the second method, the document is read by IIT 12 by skipping, for example, every other scanning line to reduce the number of pixels that are read, and the number of pixels is further reduced when the image data is written into display memory 20. In the third method, the read image data of the document is coded with a high-efficiency coding to compress its quantity. According to the second and third methods, the reduction is performed not only in the sub-scan direction but also in the main scan direction. In the color copier under consideration, the reduction in the main scan direction can be accomplished by IPS 13 by thinning the read pixels.

Comparing these three methods, one can readily see that the first method is not cost-effective since it requires a large memory capacity. However, by using a scroll button (not shown) or some other suitable means, the image as read can be observed and, hence, a desired edit area can be designated with high precision. The second method is less advantageous than the first method as regards the precision in designating an edit area. However, it is sufficient for document memory 16 to have only one half the capacity required in the first method. Further, since the image reading can be performed by skipping every other scanning line, the scanning time of IIT 12 can be reduced by one, half, contributing to the cost reduction. With the third method, the data quantity can be greatly reduced compared to the first and second methods, so that document memory 16 may have a much smaller capacity. However, the third method suffers from the disadvantage that it much time for encoding and decoding operations. While any one of these methods can be adopted, the second method is used in the embodiment under discussion because, in the discussed embodiment it is desirable to reduce the cost and processing time. If the image reading is performed every two, three or four scanning lines, the image data quantity is further reduced and the capacity of document memory 16 can be reduced accordingly. Further, IIT 12 need to operate for a sufficiently shorter period of time to accomplish rapid checking. On the other hand, skipping an increased number of scanning lines will result in a lower precision in setting a desired edit point or area. Therefore, the number of scanning lines to be skipped may be determined in consideration of such factors as the memory capacity, speed of the checking process, and the precision required in setting a desired edit point or area.

After the storage of the image data into document memory 16 in the manner described above, control means 11 instructs display controller 21 to display the image read by IIT 12 on display unit 22. In response to this instruction, display controller 21 reads the image data from document memory 16 into display memory 20 and, at the same time, it reads the prescribed menu data, i.e., "COLOR CREATE" pop-up data, from command memory 19. The two kinds of data are synthesized, and the resultant composite data is read from display memory 20 in synchronism with the scanning of display unit 22, whereby the document image and the prescribed menu are displayed on display unit 22. An example of the resultant picture is shown in FIG. 3b. In FIG. 3b, area A contains the document image consisting of a circle graph 30 and sentences indicated by horizontal lines, and area B contains the pop-up menu of "COLOR CREATE". A COLOR MODE button is for selecting a desired color mode among the four full color mode, three color mode, monochrome mode, etc. "PAINT" is a function for filling a designated area with a designated color. "FREE COLOR MODE" is a function for registering a color that is to be used in, e.g., the color conversion. "COLOR BALANCE" is a function for performing a fine adjustment of colors. "COLOR CONVERSION" is a function for converting a designated color in a document to another designated color. "SHARPNESS" is a function for adjusting the sharpness of an image. "AUTO COLORING" is a function for automatically coloring more than one closed areas as in color arrangement for the respective areas of a circle graph. "AUTO EDIT" is a function for performing edit processes of designated ranks of order on respective designated closed areas. Details of AUTO EDIT will be described later. "CANCEL" is a function for canceling a selected command option from the menu, as well as the setting of an edit point or area, so that a selection from a menu and an edit point or area can be reset. "END OF SELECTION" is a function for establishing parameters such as a selected command option of the menu, and an input edit point and/or edit area. When the END OF SELECTION button is depressed after the setting completion of all of the necessary parameters, an image into which the results of the previously selected set edit processes have been incorporated will be displayed in area A of the display screen, as will be described later. Needless to say, other edit processes may be added to the pop-up menu of COLOR CREATE.

If, for example, AUTO COLORING is selected from the chart shown in FIG. 3b. Then, as shown in FIG. 3c, a message requesting the selection of a closed area and a coloring table is displayed in area B. At the same time, buttons associated with the respective coloring tables are displayed in area B. FIG. 3c shows three coloring tables but, needless to say, the number of coloring tables may be greater or less than three.

Looking at the chart shown in FIG. 3c, a user sequentially designates the closed areas, e.g., in FIG. 3c, of circle graph 30 using coordinates inputting unit 23. He then selects a desired coloring table, say, coloring table 1, and depresses the END OF SELECTION button, whereupon control means 11 instructs IIT 12 to read the document image. At the same time, by referring to coloring table 1, control means 11 assigns different colors to the respective closed areas in the following manner: the color designated as the first rank of order in the coloring table 1 is assigned to the first pointed closed area; the color designated as the second rank to the second pointed closed area; the color designated as the third rank to the third pointed closed area; the color designated as the fourth rank to the fourth pointed closed area; and the color designated as the fifth rank to the fifth pointed closed area. Thereafter, control means 11 instructs IPS 13 to color the pointed areas with the respective assigned colors.

IPS 13 then performs the instructed coloring process on the image data sent from IIT 12, and stores the resultant image data into edit result memory 17. Edit result memory 17 has a memory capacity, similar to document memory 16.

A chart on display unit 22 as shown in FIG. 3d is produced by the above operations. Circle graph 30 which has been colored on the basis of coloring table 1 is displayed in area A, whereas a prescribed message is displayed in area B. In this way, a user can review the results of a certain edit process on the display screen before actual copying is done.

If results of the editing are not desirable, a user touches a "CHANGE" button and repeats the procedure described above. If, on the other hand, results of the editing are desirable, he touches an "END" button and then touches the START button on control panel 24. Then, the control means 11 permits IIT 12 to perform a reading operation of actual copying, permits IPS 13 to perform color arrangement in the manner designated above, and also permits IOT 14 to perform exposure, development and fusing. As a result, a copy that has received the same editing as the edit results displayed on the screen, namely, a copy has a circle graph colored in the desired way can be obtained.

Having described the manipulation procedure and the operations of the individual components in the case where the edit table is a coloring table, we now discuss the case where the edit table is an edit process table into which various edit processes are written with ranks of order attached thereto. FIG. 4 is shows an example of the composition of an edit process table 100 into which N edit processes $E_1, E_2, E_3, \ldots, E_n$ are written with ranks of order attached thereto. Specific examples of such edit processes are as follows: edit process $E_1$, given the first rank of order, fills the background of a designated closed area with a solid red color while reversing black characters in that area; edit process $E_2$, given the second rank, superimposes a red mesh of a prescribed density on a designated closed area; edit process $E_3$, given the third rank, converts black characters in a designated closed area to red ones; and edit process $E_4$, given the fourth rank, provides underlines in red color. While the number N may take any value, 5 to 7 will suffice for practical purposes as in the case of the coloring table. Further, more than one edit process table may be provided as in the case of the coloring table.

The edit process table shown in FIG. 4 is used in the following manner. Suppose here the case where the edit process with the first rank of order is performed on a portion of certain sentences that need to be called to the reader's attention, e.g., big headline, the edit process with the second rank is performed on a selected portion, e.g., sub-headline, and the edit process with the third rank is performed on another selected portion, e.g., a certain character in the sentences. The manipulation procedure and the operations of the individual components of this case are the same as those described above, up to the stage shown in FIG. 3b. In this case, the AUTO EDIT button in the picture of FIG. 3b is touched.

Figure 5A:
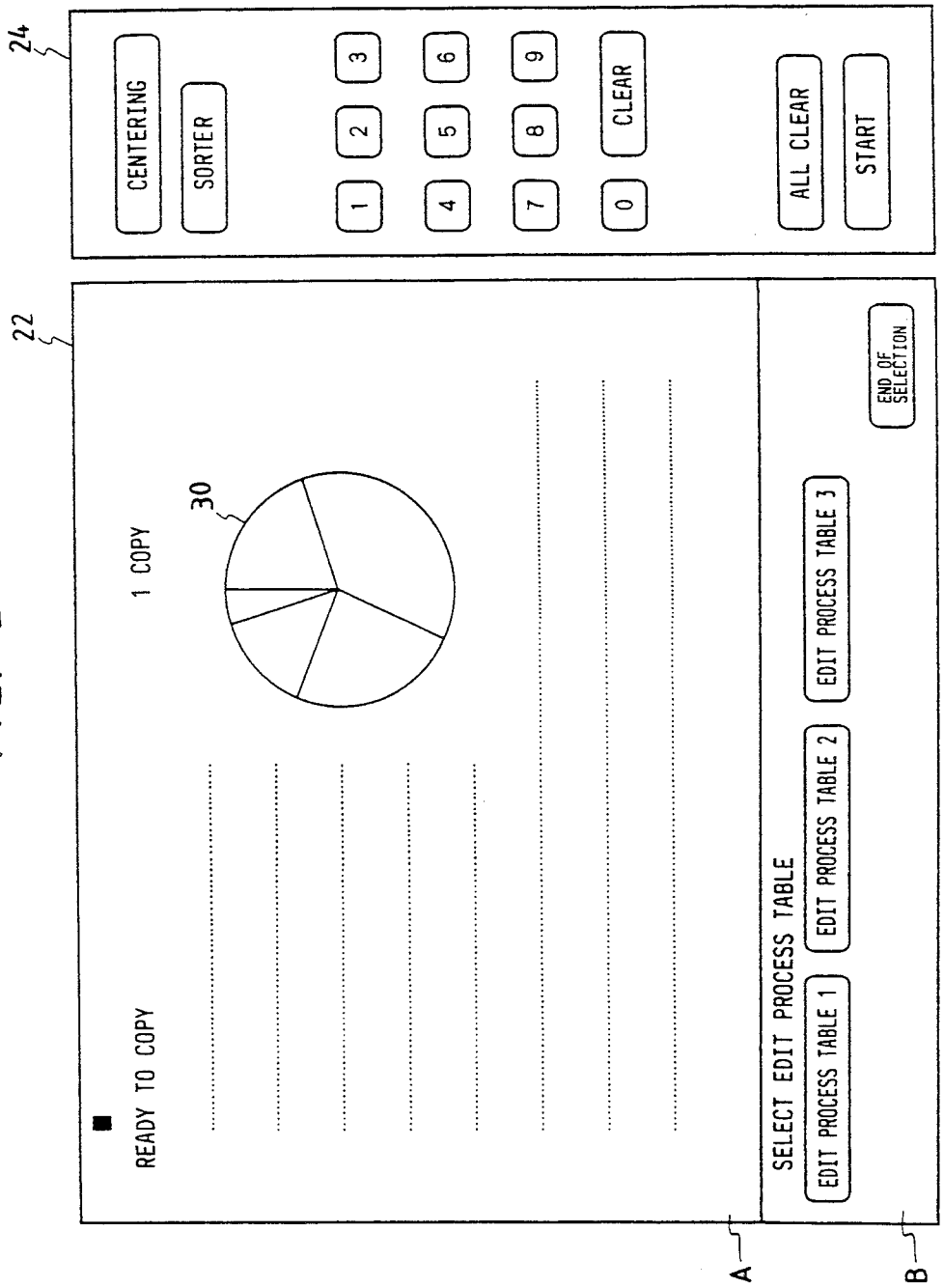
FIGS. 5a and 5b are charts showing examples of various displays on the screen when the edit process table is used.

When the AUTO EDIT button is touched, control means 11 instructs display controller 21 to display the first auto edit pop-up menu, whereupon a message requesting the selection of a particular edit process table is displayed as shown in FIG. 5a. Then, to perform the edit processes described above, a user selects, e.g., edit process table 1 and then touches an END OF SELECTION button, whereupon the next pop-up menu appears in area B of the chart as shown in FIG. 5b, requesting the designation of a closed area and its rank of order.

Figure 5B:
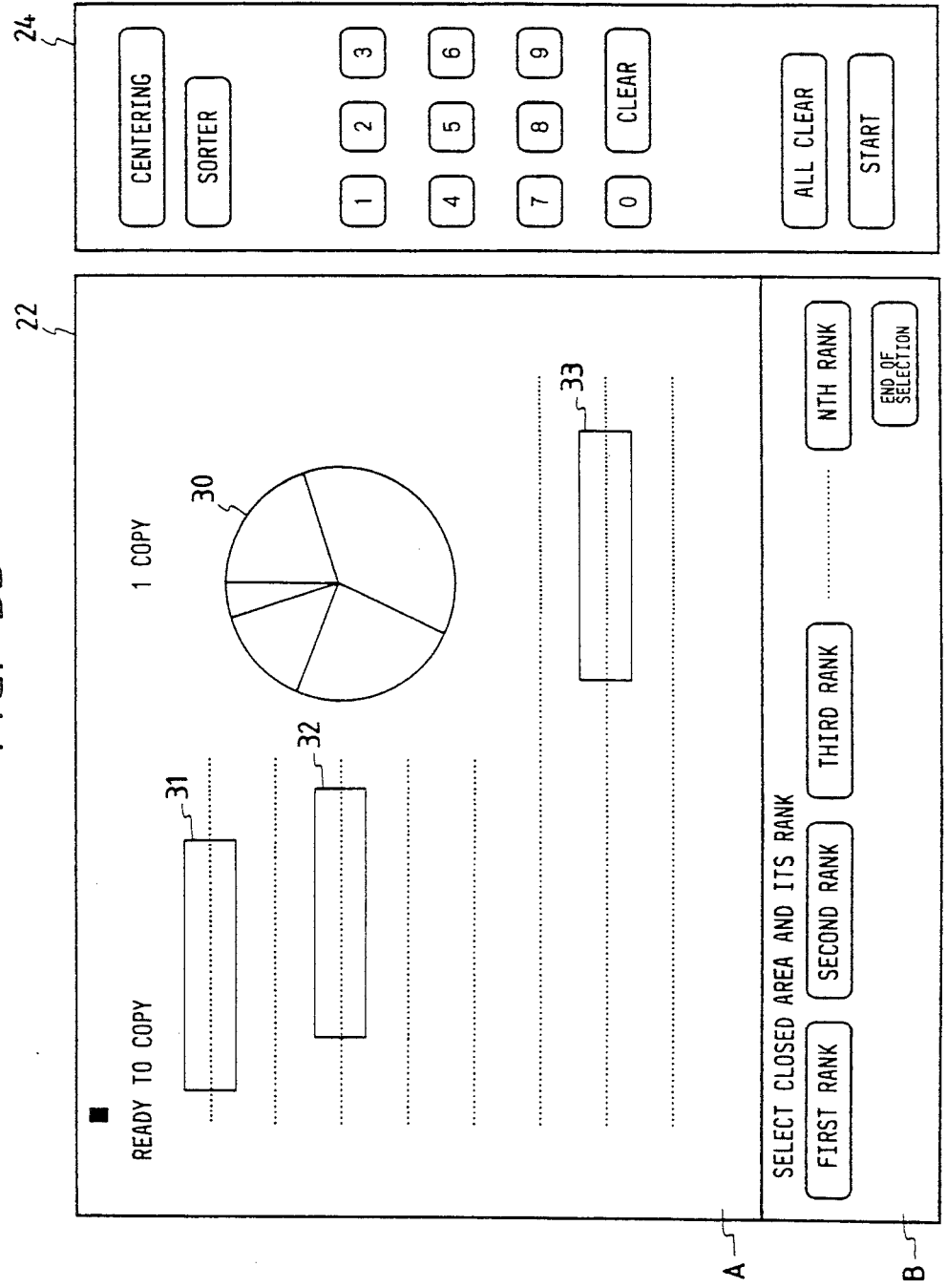

Looking at the picture shown in FIG. 5b, the user designates closed area 31 using coordinates inputting unit 23, and then touches the FIRST RANK button. He then designates closed area 32 and touches the SECOND RANK button. Further, he designates closed area 33 and touches the THIRD RANK button. Thereafter, he touches the END OF SELECTION button, whereupon control means 11 instructs IIT 12 to read the document image. At the same time, by referring to the edit process table 100 of FIG. 4, control means 11 assigns different edit processes to the respective closed areas of edit process table 100 in the following manner: closed area 31 is assigned the edit process designated as the first rank of order in edit process table 100, for example, the process of filling the background of the designated closed area with a solid red color while reversing black characters in that area; closed area 32 is assigned the edit process designated as the second rank of order, for example, the process of superimposing a red mesh of a prescribed density on the designated closed area; and the closed area 33 is assigned the edit process designated as the third rank of order, for example, the process of converting black characters in the designated closed area to red ones. Thereafter, control means 11 instructs IPS 13 to perform the respective edit processes on the designated closed areas. Designation of a rectangular closed area is performed using coordinates inputting unit 23 by designating two opposite apexes of the rectangle of interest.

IPS 13 then performs the instructed edit processes on the image data provided from IIT 12, and stores the resultant image data into edit result memory 17.

As a result of these operations, an image that has been given the prescribed edit processes is displayed in area A of the picture on display unit 22. At the same time, a message of the same type as shown in FIG. 3d appears in area B. Further, as in the case of the coloring table, if results of the editing are not desirable, the user touches the CHANGE button and repeats the procedure described above. If, on the other hand, the results of the editing are desirable, he touches the END button in the picture and further touches the START button. As a result, as in the case of the coloring table, a copy that has received the same editing as the edit results displayed on the screen can be obtained.

Figure 7A:
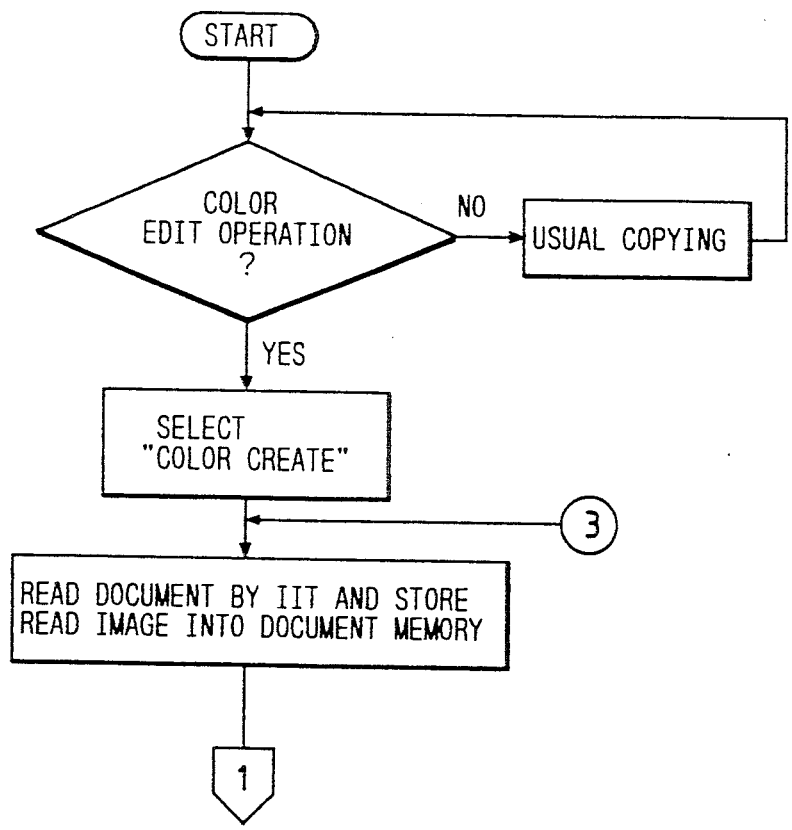
FIGS. 7a-7c shows a flow chart including operations performed by the control means.
Figure 7B:
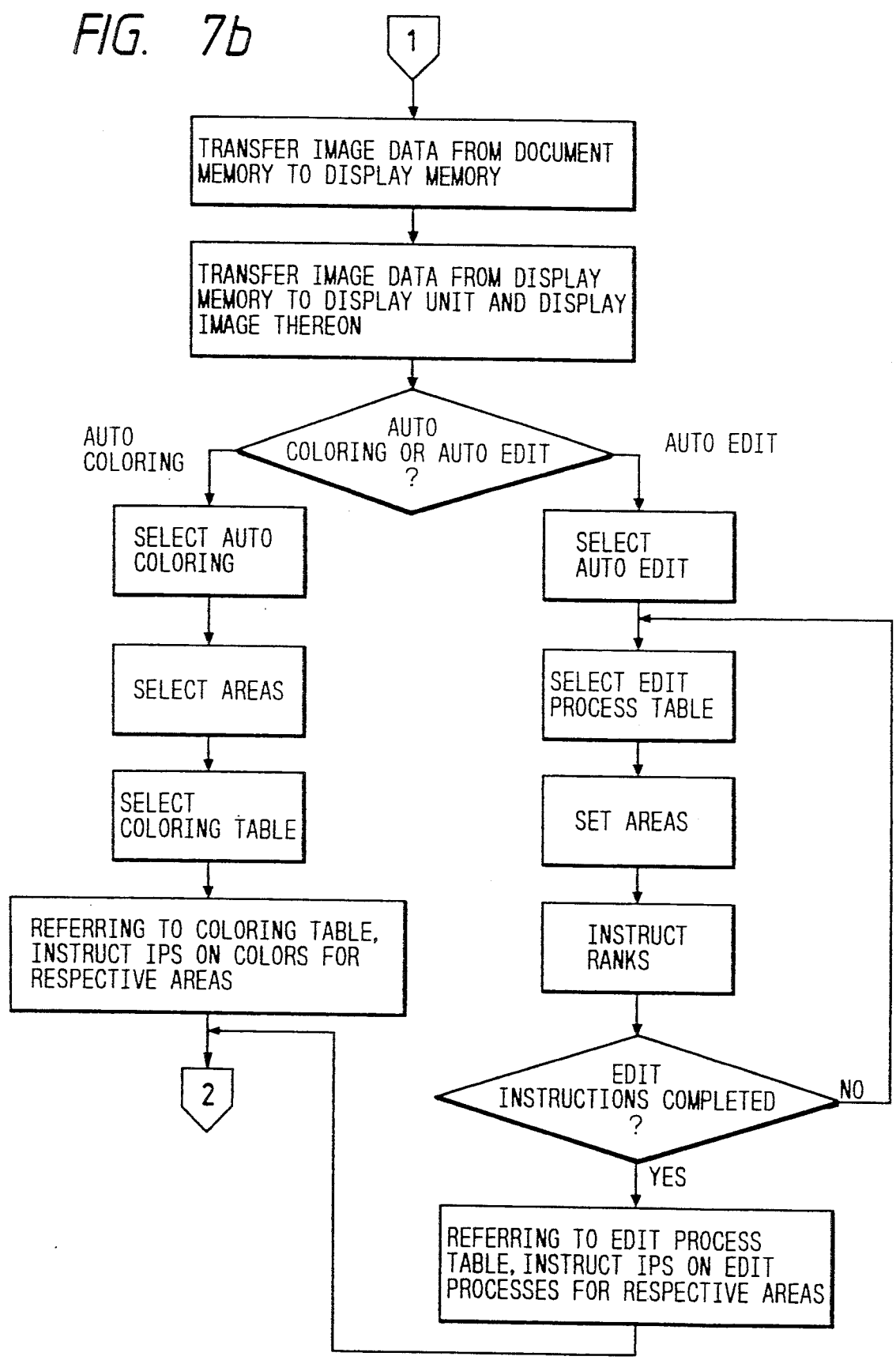
Figure 7C:
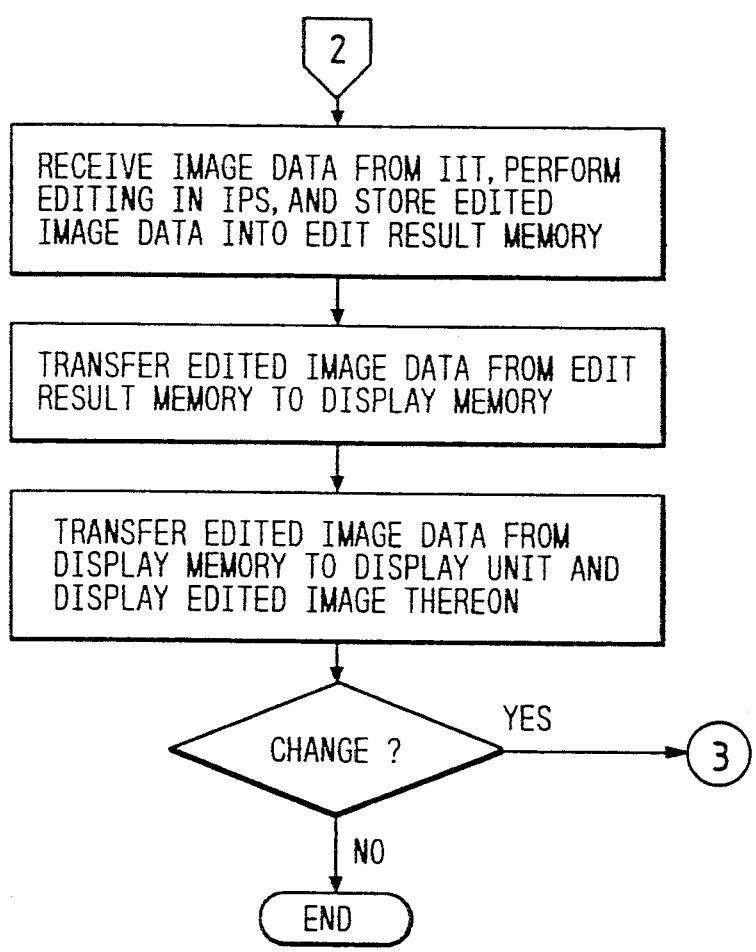

FIGS. 7a-7c show a flow chart including the operations in AUTO COLORING and AUTO EDIT performed by control means 11 of one preferred color copier according to the embodiment.

While one preferred embodiment of the present invention has been described on the foregoing pages, it should be noted that this is not the only embodiment of the present invention and it will be apparent to one skilled in the art that various modifications can be made. For example, instead of preliminarily storing the coloring tables and the edit process tables in the control means, the system may be designed such that a user looks at an appropriate menu to optionally change colors to be arranged or contents of the edit processes. In addition, the edit processes given respective ranks of order in the edit process table are by no means limited to those described above, but various other edit processes may be employed.

As will be apparent from the foregoing description, a plurality of closed areas can be colored or given edit processes with ordered ranks in accordance with the present invention.

The document image read by IIT is displayed on the screen of the display unit, so that a particular edit area and edit process can be directly set while looking at the screen, and a user is permitted to review the result of that particular edit process on the screen. In other words, the user can preview the result of a particular edit process without performing actual copying. This eliminates the need of performing test printing or other preliminary steps and contributes to the effective use of expensive color toners

What is claimed is:

1. An image recording apparatus, comprising:
   means for providing image data of an image;
   means for providing at least one edit table listing a plurality of edit processes and respective rank orders of the edit processes;
   means for receiving instructions designating at least one edit area in the image with a corresponding rank order of the edit area, and for designating one of the edit tables;
   means for performing at least one edit process in the designated edit table on a part of the image data corresponding to the designated edit area, to produce edited image data, the performed edit process and the designated edit area having a same rank order;

means for displaying the image based on the image data and an edited image based on the edited image data; and means for producing a hard body based on the edited image data.

2. The apparatus according to claim 1, wherein said image data providing means reads the image from a document.

3. The apparatus according to claim 1, wherein the edit table providing means stored the edit tables.

4. The apparatus according to claim 1, wherein the plurality of edit processes are processes for coloring areas in the image with different colors.

5. The apparatus according to claim 1, wherein the instructions receiving means includes a coordinates inputting unit disposed on the displaying means, and wherein the displaying means further displays a menu containing information necessary for designating one of the edit tables.

* * * * *

UNITED STATES PATENT AND TRADEMARK OFFICE
CERTIFICATE OF CORRECTION

PATENT NO. : 5,136,399
DATED : August 04, 1992
INVENTOR(S) : Teruyuki Aoyama

It is certified that error appears in the above-identified patent and that said Letters Patent is hereby corrected as shown below:

Title Page, Title, change "BANK" to --RANK--.

Claim 1, column 11, line 4, change "body" to --copy--.

Claim 3, column 11, line 10, change "stored" to --stores--.

Signed and Sealed this

Twenty-eighth Day of September, 1993

*Attest:*

BRUCE LEHMAN

*Attesting Officer*     *Commissioner of Patents and Trademarks*